United States Patent [19]

Gay

[11] Patent Number: 5,563,001
[45] Date of Patent: Oct. 8, 1996

[54] ENCAPSULATED FERROMAGNETIC PARTICLES SUITABLE FOR HIGH TEMPERATURE USE

[75] Inventor: David E. Gay, Noblesville, Ind.

[73] Assignee: General Motors Corporation, Detroit, Mich.

[21] Appl. No.: 121,859

[22] Filed: Sep. 17, 1993

Related U.S. Application Data

[63] Continuation-in-part of Ser. No. 45,148, Apr. 12, 1993, abandoned, and Ser. No. 976,859, Nov. 16, 1992, abandoned.

[51] Int. Cl.$^6$ .................................................. G11B 5/66
[52] U.S. Cl. ..................... 428/694 R; 428/403; 428/407; 428/634 BA; 428/694 B; 428/900; 264/126; 264/319; 264/328.1; 264/328.17; 148/105; 148/104; 252/62.54; 427/214; 427/216
[58] Field of Search ..................... 428/407, 403, 428/694 R, 900, 694 BA, 694 B; 264/126, 319, 328.1, 328.17; 148/105, 104; 252/62.54; 427/214, 216

[56] References Cited

U.S. PATENT DOCUMENTS

| | | | |
|---|---|---|---|
| 4,601,765 | 7/1986 | Soileau et al. | 148/104 |
| 4,713,288 | 12/1987 | Kokaku et al. | 428/336 |
| 4,725,490 | 2/1988 | Goldberg | 428/292 |
| 5,098,940 | 3/1992 | Brooks | 524/227 |
| 5,211,896 | 5/1993 | Ward | 264/126 |
| 5,271,891 | 12/1993 | Gay | 419/36 |

Primary Examiner—Leszek Kiliman
Attorney, Agent, or Firm—Lawrence B. Plant

[57] ABSTRACT

A polymeric coating material is provided for coating powdered materials, and more particularly, for coating powdered metals which are compression molded to form magnetic cores. The preferred polymeric materials are polybenzimidazole, an aromatic polyamide such as polyphthalamide, and appropriate polyimides which, when properly applied to metal particles to form a magnetic core, are characterized as having a sufficiently high heat deflection temperature of at least about 270° C., so as to prevent the degradation of the mechanical and magnetic properties of the magnetic core at exposure at elevated temperatures. Each of these preferred coating materials is characterized by excellent mechanical properties, chemical resistance and dielectric characteristics within this temperature range.

7 Claims, No Drawings

ENCAPSULATED FERROMAGNETIC PARTICLES SUITABLE FOR HIGH TEMPERATURE USE

This application is a continuation-in-part of prior applications U.S. Ser. No. 08/045,148 filed Apr. 12, 1993 and U.S. Ser. No. 07/976,859 filed Nov. 16, 1992, now both abandoned.

The present invention generally relates to coating metal particles with a polymer for purposes of forming solid metallic articles, such as compression molded magnetic cores, which are particularly useful at high operating temperatures. More particularly, this invention relates to an improved coating, wherein the compression molded high temperature magnetic cores are formed from coated ferromagnetic particles having a polymer coating of polybenzimidazole, polyphthalamide or another suitable aromatic polyamide, or a suitable polyimide as the polymer coating.

BACKGROUND OF THE INVENTION

The use of powdered metals, and particularly iron and its alloys, is known for forming magnets, such as soft magnetic cores for transformers, inductors, AC and DC motors, generators, and relays. An advantage to using powdered metals is that forming operations, such as compression or injection molding and/or sintering techniques, can be used to form intricate molded part configurations, such as magnetic cores, without the need to perform additional machining and piercing operations. As a result, the formed part is often substantially ready for use within its working environment as formed by the molding process.

Molded magnetic cores for AC applications generally should have low magnetic core losses. To provide low core losses, the individual metal particles within the magnetic core must be electrically insulated from each other. Numerous types of insulating materials, which also act as the binder required for molding, have been suggested by the prior art, including inorganic materials such as iron phosphate and alkali metal silicate, as well as an extensive list of organic polymeric materials. It is also known to coat a powdered metal with an inorganic undercoating and then provide an organic topcoat. In addition to providing adequate insulation and adhesion between the metal particles upon molding, the coating material should also have the ability to provide sufficient lubrication during the molding operation so as to enhance the flowability and compressibility of the particles, and therefore enable the particles to attain maximum density and strength.

As noted above, the individual metal particles of a magnetic core for AC applications must be electrically insulated from each other to provide low core losses. Because the insulating material must remain within the magnetic core, a magnetic core's maximum operating temperature will often be determined by the heat resistant properties of the material used to adhere the metal particles together. If the magnetic core is exposed to a temperature which exceeds the heat deflection temperature of the coating material, the ability of the coating material to encapsulate and adhere the particles will likely be degraded, which could ultimately destroy the magnetic core. Even where physical destruction of the magnetic core does not occur, the magnetic field characteristics of the magnetic core will likely be severely impaired because of the degradation of the insulating capability of the coating material due to the elevated temperatures.

As disclosed in U.S. patent application Ser. No. 07/710,427, now U.S. Pat. No. 5,211,896, filed Jun. 7, 1991, to Ward et al. and assigned to the assignee of the present invention, polyetherimide, polyethersulfone and polyamideimide have been found to perform well as the coating material for powdered iron and/or powdered iron alloys, so as to form insulated magnetic cores, particularly with respect to the ability to bind the iron particles together and resist thermal and chemical attack, and the ability to serve as a lubricant during the compression molding process. In addition, these polymers adhere well to the underlying metal particle. These polymers are soluble in a solvent to permit their application to the iron particles using a fluidized bed process which is known in the art.

However, a shortcoming associated with the teachings of Ward et al. is that polyetherimide and polyethersulfone have operating temperatures, as defined by their heat deflection temperatures, which may be insufficient for use in high temperature applications of greater than about 200° C. As a result, magnetic cores formed with these materials may have a limited temperature capability. While polyamideimide has a higher heat deflection temperature of about 280° C., and thus a higher operating temperature limit, developing optimum high temperature mechanical properties requires postcuring through an extended, closely controlled temperature cycle. Such a requirement tends to make polyamideimide impractical from a manufacturing and economic standpoint. Further, in some instances, these polymers may not compression mold suitably for certain applications due to insufficient lubricity. As a consequence, the magnetic cores may have unsuitably low densities, which corresponds to lower magnetic permeability.

As disclosed in U.S. patent application Ser. No. 07/915,587 filed Jul. 20, 1992, now U.S. Pat. No. 5,271,891 to Gay and assigned to the assignee of the present invention, polyphenylene oxide exhibits sufficient lubricity to significantly enhance the compressibility of metal particles coated with the polyphenylene oxide during molding and particularly during sintering operations. In addition, the polyphenylene oxide performs well as an insulating material and is particularly resistant to thermal and chemical attack. However, the polyphenylene oxide shares a common shortcoming with polyetherimide and polyethersulfone, in that the polyphenylene oxide generally has a useful temperature of no more than about 200° C., thereby limiting its use at higher operating temperatures.

Thus, it would be desirable to provide a coating for powdered metals which has the ability to withstand relatively high operating temperatures, for molding magnetic cores from such coated metal particles, such that the mechanical properties and desired magnetic characteristics of the molded magnetic core do not deteriorate at high temperature applications. In addition, the coating should be soluble in a suitable solvent, and capable of improving lubrication during the molding process and providing adhesion between the metal particles after molding, so as to attain maximum density and strength of the as-molded article.

SUMMARY OF THE INVENTION

It is an object of this invention to provide a coating material for metal particles, wherein the coating material has a heat deflection temperature which is sufficiently high so as to enable a magnetic core molded with the coating material to maintain its mechanical and magnetic characteristics for extended use at relatively high temperatures.

It is a further object of this invention that such a coating material have high strength and insulating properties, such that the coating material is capable of strongly adhering the metal particles together so as to permit immediate handling and use of the magnetic core after the molding process, and such that the metal particles are sufficiently insulated from each other so as to facilitate low core losses in the magnetic core.

It is still a further object of this invention that such a coating material require a facile and relatively uncomplicated curing process.

It is another object of this invention that such a coating material also exhibit high compressibility to facilitate compression molding of the metal particles, so as to optimize the density of the magnetic core produced.

It is still another object of this invention that such a coating material be sufficiently resistant to chemicals.

It is yet another object of this invention that such a coating material be sufficiently soluble in an appropriate solvent so as to permit its deposition onto the metal particles, such as with a fluidized bed process.

In accordance with a preferred embodiment of this invention, these and other objects and advantages are accomplished as follows.

According to the present invention, there is provided a group of polymeric materials for coating powdered metals, particularly iron and iron alloys, wherein the polymeric materials each have a heat deflection temperature which is sufficiently high, so as to enable a magnetic core molded with the coating material to maintain both its mechanical properties and its magnetic characteristics at high temperatures.

The preferred coating materials are sufficiently soluble, sufficiently resistant to chemicals, and exhibit relatively high strength and good dielectric properties. As a result, the coating materials can be applied by fluidized bed processes, and are suitable for use in applications which require high strength and insulating properties within a relatively high temperature environment. The coating materials are capable of adhering the metal particles together strongly so as to form a molded article using a compression molding process. Furthermore, core losses produced by the insulating effect of the coating materials are suitably low to ensure the desired magnetic characteristics of the magnetic core. Finally, the coating materials are sufficiently lubricous to promote compaction and densification during the compression molding process. The above capabilities are particularly advantageous for the manufacture of magnetic cores which are compression molded from the coated metal particles.

The polymeric materials which have been determined to be most capable of providing the above features are polybenzimidazole (PBI), suitable aromatic polyamides such as polyphthalamide (PPA), and preferred polyimides (PI) such as a polyimide amine or polyimides which have been derived from 3-4'oxydianiline and another component; wherein each of these preferred coating materials has a heat deflection temperature in excess of about 270° C. Thus, the articles molded from metal particles coated with any of the preferred coating materials are particularly suitable for use at relatively high operating temperatures. Specifically, a magnetic core formed with any one of these preferred coating materials is able to retain its mechanical and magnetic properties up to at least the corresponding heat deflection temperature of the particular coating material used. In addition, these coating materials are highly resistant to chemical attack.

The preferred coating materials can each achieve the above advantages while being present in relatively low quantities, i.e., less than about one weight percent as compared to the mass of the iron particles. The preferred coating process for purposes of the present invention is a Wurster-type spray-coating fluidized bed of the type known to those skilled in the art, though other coating methods may be used. The fluidized bed serves to recirculate the metal particles within a confined volume numerous times, until each particle has acquired a substantially uniform layer of the coating material, which is sufficient for purposes of the particular application.

The coated metal particles may then be introduced into a suitable molding apparatus, such as a compression or injection molding machine, where the coated metal particles are compressed within a heated mold cavity under a suitably high pressure to compact the coated metal particles to produce a dense, strong and solid magnetic article.

Other objects and advantages of this invention will be better appreciated from the following detailed description.

DETAILED DESCRIPTION OF THE INVENTION

A group of polymeric coating materials is provided for coating powdered materials, and more particularly, for coating powdered iron including ferromagnetic iron alloys which are molded under pressure, so as to form, for example, magnets for such applications as AC and DC magnetic cores used in the automotive industry. It is to be noted that the molding of other types of articles is also within the scope of the teachings of this invention.

According to the present invention, the preferred polymeric materials are polybenzimidazole (PBI), suitable aromatic polyamides such as polyphthalamide (PPA), and suitable polyimides (PI) such as a polyimide amine or polyimides which have been derived from 3-4'oxydianiline and another component; wherein each of the preferred polymeric materials is a thermoplastic having a heat deflection temperature in excess of about 270° C.

Polybenzimidazole is available under the tradename Celazole U-60 from the Hoechst Celanese Corporation; a preferred aromatic polyamide such as polyphthalamide is available under the tradename Amodel AD-1000 from Amoco Performance Products, Inc., with another preferred aromatic polyamide being available from Imitech under the tradename 302H; and preferred polyimides are available under the tradenames Imitech 1-TP1, 201A and 841 from Imitech, with the 1-TP1 being a polyimide which has been derived from 3-4'oxydianiline and 4,4'oxydiphthalic anhydride, the 201A being a polyimide which has been derived from 3-4'oxydianiline and polymethylene dianiline, and the 814 being a polyimide amine such as a polyimide with the structure of an imide amine.

It is to be noted that although these are the preferred polymeric coatings of this invention, other suitable polymers having a high heat deflection temperature could also be used.

Each of the preferred coating materials is characterized by excellent mechanical properties and dielectric characteristics over a temperature range which exceeds at least about 270° C., as generally determined by a standardized heat deflection temperature per ASTM test D-648 entitled "Deflection Temperature of Plastics Under Flexural Load", wherein a sheet of the polymeric material is supported at three points and deflection is measured as a function of increasing temperature. Although the specific examples discuss the three preferred types of thermoplastics described above, it is foreseeable that other thermoplastics having a heat deflection temperature of at least about 270° C. could also be used. In addition, it is possible that thermoset polymers could be used, however a suitable high temperature epoxy would be required.

More specifically, polybenzimidazole has a heat deflection temperature of about 435° C., the preferred aromatic polyamides, including polyphthalamide, have a heat deflection temperature of generally at least about 285° C., and the preferred polyimides have a heat deflection temperature of between about 270° C. and about 290° C., with the Imitech 201A polyimide, which is derived from 3-4'oxydianiline and polymethylene dianiline, having a heat deflection temperature of at least about 400° C.

Consequently, for example, a magnetic core, which is formed from ferromagnetic metal particles coated with polybenzimidazole, will not suffer significant degradation of the adhesive strength between the metal particles, or will not experience detrimental flow of the coating so as to degrade the insulating properties of the coating, when exposed to temperatures of about 435° C. As a result, the mechanical and dielectric properties of the magnetic core will also withstand these relatively high operating temperatures. Thus, the desirable magnetic field characteristics of the magnetic core, like low core loss, will not be significantly degraded.

Another advantageous feature of the preferred coating materials is that, as thermoplastics, they do not require curing. Accordingly, articles formed with these coating materials can be used immediately after molding. In addition, the preferred coating materials are each soluble in a suitable solvent, thereby permitting their use in the preferred Wurster-type fluidized coating process described above and known in the art. Specifically, polybenzimidazole is soluble in 1-methyl-2-pyrrolidone with lithium chloride, polyphthalamide is soluble in methylene chloride, and the preferred polyimides are generally soluble in N,N-dimethyl acetamide with lithium chloride, though it is foreseeable that other suitable solvents exist and could be used.

Each of the above characteristics are advantageous in view of the preferred coating and molding processes utilized by the present invention. It is also foreseeable that the preferred coating materials could be used in a slurry coating process which does not require that the coating material be first dissolved in a solvent. However, it is generally preferable to use a fluidized coating process to achieve a more uniform coating on the powdered materials, which promotes low core losses.

Furthermore, the preferred coating materials of this invention tend to be insoluble in solutions other than their named solvents, thereby making them substantially impervious to chemical attack within most environments, such as that for an engine component of an automobile.

According to the present invention, when properly applied to ferromagnetic metal particles which are compacted to form a molded article, such as a magnetic core for AC applications, the preferred coating materials provide sufficient adhesion between adjacent metal particles to sustain the desired strength and shape of the magnetic core after molding. Unexpectedly, the usable temperature for a magnetic core formed with ferromagnetic metal particles coated with any one of the preferred coating materials is at least about 400° C., permitting extended use of the magnetic core in high temperature applications. Thus, magnetic core losses which are sufficiently low to attain the desired magnetic characteristics of an AC motor are also maintained at these elevated temperatures.

The preferred coating materials also have desirable flow and feed properties, and are compressible and dense, making them highly suitable for use in compression molding processes. As a result, the preferred coating materials can be readily handled with conventional delivery equipment, and maximum metal particle density can be achieved with a compression molding process.

Each of the preferred coating materials is able to achieve the above advantages while being present in quantities as low as about one weight percent, and most preferably in the range of about 0.40 to about 0.75 weight percent, as compared to the metal particles. Though it is foreseeable that greater quantities of the preferred coating materials could be used, a corresponding change in mechanical properties and/ or a reduction in magnetic properties may result.

The balance of the molded article, about 99 weight percent, consists of ferromagnetic particles sized preferably in the range of about 5 to about 400 microns, and more preferably in the range of about 125 to about 350 microns to attain magnetic cores of high permeability, as is discussed more fully later.

The preferred method for coating the ferromagnetic metal particles utilizes a Wurster-type spray-coating fluidized bed of the type known to those skilled in the art, although other methods which produce a uniform coating on the particles could also be used. The fluidized bed essentially includes a concentric pair of upright cylindrical vessels, one within the other. The outer vessel has its lower axial end closed to form a floor for the outer vessel only, with the inner vessel being suspended above this floor. The floor has perforations of various sizes through which heated air is drawn through both vessels. The perforations are sized and located such that the majority of the air flow will occur up through the inner vessel, and then down between the inner vessel and the outer vessel.

Prior to introduction into the fluidized bed, it may be preferred, though not necessary, that the metal particles be presorted according to size to promote substantially uniform coating thicknesses on the metal particles during the coating process. The metal particles would first be sorted into batches of approximately same-sized particles (e.g., small, medium and large). Each batch is then separately processed, and later remixed into any desired particle size distribution.

At start-up, a batch of the powdered metal is deposited on the floor and the powder to be coated is circulated at a rate sufficient to fluidize the particles. According to the batch size and particle sizes, the flow rate of the air will generally be in the range of about 100 to about 200 cubic meters per hour. Also, the air temperature will generally range between about 55° C. and 70° C. when the coating process begins, but will vary during the coating process with the introduction and evaporation of the solvent. If the air temperature is too low, the solvent will not evaporate upon contact with the metal particle thereby resulting in a poorly coated particle, while if the air temperature is too high, the solvent evaporates too quickly thereby also preventing the formation of a uniformly thick coating on the particles. As the coating process progresses, each of the particles are randomly coated an extraordinarily large number of times, so as to ensure a uniformly thick coating on the particle.

A spray nozzle located on the floor under the inner chamber serves to introduce one of the preferred coating materials, which is dissolved in an appropriate solvent, into the chamber. The solution is preferably about 5 to about 15 weight percent coating material, and more preferably about 10 weight percent coating material, so as to maximize the efficiency of the coating procedure, though suitable coating results can be obtained with an extremely large range of solutions.

The solution is then sprayed into the fluidized bed. Within the fluidized bed, the solvent is evaporated, leaving the coating material encapsulated onto the particles. Once coated, the encapsulated metal particles are recirculated by the action of the heated air between the confined volumes defined by the inner and outer vessels. Circulation is continued until each metal particle has acquired a uniform and sufficiently thick coating of the particular coating material used. The typical thickness corresponds to about 0.1 to about one weight percent, and more preferably between about 0.40 and about 0.75 weight percent, as noted above. Typically, the coating thickness will be in the range of about 0.3 to about 4.5 microns for metal particles in the preferred range of about 5 to about 400 microns.

As stated previously, other deposition methods may also be employed so long as a substantially uniform coating is obtained.

Thereafter, the coated metal particles may be introduced into a suitable molding apparatus. Typical molding processes used to form, for example, magnetic cores, include compression and injection molding, and are generally performed at mold temperatures ranging from about room temperature to about 370° C., and more preferably between about 260° C. and 370° C., with the particles being preheated to about 150° C. to about 175° C. At these temperatures, the preferred coating materials are sufficiently fluid to flow under pressure during the molding operation, while also being sufficiently viscous to adhere to the metal particles and provide a lubricating action between adjacent metal particles. As a result, automated handling equipment can be used to process and feed the coated metal particles throughout the coating and molding processes, resulting in shorter cycle times. Yet the compaction molded articles, such as magnetic cores, formed by these processes are characterized by being physically strong and dense, so as to generally enable immediate handling and use of the as-formed molded articles, as well as permit machining of the molded articles if necessary.

In that the metal particles and the mold cavity are preheated, the coated metal particles will readily flow into the mold cavity and, when subjected to typical molding pressures of about 20 to about 50 tons per square inch (tsi), will flow sufficiently to become compacted and form a molded article, such as a ferromagnetic core whose density is preferably greater than about 7.0 grams per cubic centimeter. The coating and molding processes described above can be widely varied to alter the mechanical and magnetic properties of the molded article, as is known in the art.

To determine the high temperature capabilities of magnetic bodies formed from ferromagnetic particles coated in accordance with this invention, individual quantities of ferromagnetic particles were selectively coated with either the Imitech 201A polyimide, the preferred aromatic polyamide polyphthalamide, or polybenzimidazole, in accordance with the fluidized bed process described above. The ferromagnetic particles generally had a particle size of about 10 to about 350 microns and were coated such that the coating composed about 0.75 weight percent of the coated particles.

Transverse rupture bars of each material were then formed by room temperature compression molding at a molding pressure of about 50 tsi. The transverse rupture bar samples were approximately 1.25 inches long, 0.5 inch wide, and 0.375 inch deep.

After forming, transverse rupture bars of each coating material underwent a one hour post-bake operation at various temperatures to evaluate the mechanical properties of each of the coating materials after being subjected to elevated temperatures. Strength tests were then conducted with the transverse rupture bars to determine their load at failure, along with ultimate tensile stress and Young's modulus, in accordance with ASTM test B528-83A, entitled "Transverse Rupture Strength of Sintered Metal Powder Specimens."

Results of the tensile tests are provided below in Table I. In the table, the Imitech 201A polyimide is identified as PI, polyphthalamide is identified as PPA, and polybenzimidazole is identified as PBI.

TABLE I

|  | PI | PPA | PBI |
| --- | --- | --- | --- |
| 175° C. Post Bake |  |  |  |
| Load (lbs) | 36.0 | 89.3 | 40.0 |
| Stress (psi) | 2486 | 5537 | 2911 |
| Young's Modulus | $8.5 \times 10^5$ | $9.7 \times 10^5$ | $5.3 \times 10^5$ |
| 285° C. Post Bake |  |  |  |
| Load (lbs) | 61.2 | 95.8 | 63.6 |
| Stress (psi) | 4231 | 5964 | 4480 |
| Young's Modulus | $15.0 \times 10^5$ | $15.1 \times 10^5$ | $11.2 \times 10^5$ |
| 400° C. Post Bake |  |  |  |
| Load (lbs) | 82.5 | 102.1 | 201.9 |
| Stress (psi) | 5704 | 6310 | 14,220 |
| Young's Modulus | $19.5 \times 10^5$ | $24.1 \times 10^5$ | $35.7 \times 10^5$ |
| 510° C. Post Bake |  |  |  |
| Load (lbs) | 21.2 | 40.1 | 218.7 |
| Stress (psi) | 1465 | 2496 | 15,400 |
| Young's Modulus | $5.0 \times 10^5$ | $9.5 \times 10^5$ | $40.8 \times 10^5$ |

The above data illustrates that the preferred coating materials have suitable strength after exposure to the elevated temperatures. As shown from the data, transverse rupture bars formed with these coating materials actually required a heavier load for failure as the post-bake temperature was increased up to and including about 400° C., with those formed with polybenzimidazole (PBI) requiring even higher loads for failure after a post-bake temperature of about 510° C. Unexpectedly, the transverse rupture bars formed with polyphthalamide and polybenzimidazole possessed temperature capabilities in excess of the heat deflection temperatures for these polymers (about 285° C. and about 435° C., respectively). The above data indicated that useful magnetic ferromagnetic bodies can be formed from these preferred coating materials for use at elevated temperatures of at least about 400° C.

To evaluate the magnetic properties of magnetic bodies formed from the above preferred coating materials, toroidal test samples of each material were formed by compression molding at about 290° C. with a molding pressure of about 50 tsi, and then post-baked at 400° C. for one hour. The toroidal test samples had an outer diameter of about 2 inches, an inner diameter of about 1.7 inches, and a cross sectional thickness of about 0.25 inch. Samples of each preferred coating material were then tested to determine the flux density ($B_{max}$) in gauss, total core loss (Pcm) in watts per kilogram, permeability, and density in grams per cubic centimeter, when exposed to several frequency levels.

Results of these tests are provided below in Table II. In the table, each of the coating materials are identified as before in Table I.

TABLE II

| | PI | PPA | PBI |
|---|---|---|---|
| Freq = 1.2 Hz | | | |
| Bmax | 14,863 | 12,102 | 15,046 |
| Total Core Loss | 640.4 | 511.1 | 1518.3 |
| Permeability | 78.3 | 64.9 | 81.7 |
| Density | 7.4 | 7.1 | 7.4 |
| Freq = 0.8 Hz | | | |
| Bmax | 14,904 | 12,013 | 15,122 |
| Total Core Loss | 497.3 | 238.7 | 1117.7 |
| Permeability | 78.2 | 65.2 | 82.4 |
| Density | 7.4 | 7.1 | 7.4 |
| Freq = 0.4 Hz | | | |
| Bmax | 14,803 | 11,897 | 15,027 |
| Total Core Loss | 435.9 | 113.5 | 268.8 |
| Permeability | 81.9 | 66.3 | 90.0 |
| Density | 7.4 | 7.1 | 7.4 |
| Freq = 0.1 Hz | | | |
| Bmax | 15,566 | 11,422 | 15,038 |
| Total Core Loss | 284.4 | 25.3 | 103.8 |
| Permeability | 105.1 | 72.1 | 100.1 |
| Density | 7.4 | 7.1 | 7.4 |

The above data illustrates that useful magnetic core bodies having acceptable permeabilities were obtained. The polyimide (PI) and polyphthalamide (PPA) samples exhibited lower core losses than the polybenzimidazole (PBI) samples. It is expected that even greater improvements could be made by achieving a more uniform coating on the individual ferromagnetic particles, or by using lower molding pressures.

From the above, it will be apparent to one skilled in the art that a significant advantage of the present invention is that there is provided a group of polymeric coatings for powdered metals whose heat deflection temperatures are in excess of at about 270° C. Furthermore and unexpectedly, each of the preferred coating materials tested possess temperature capabilities of at least about 400° C., which is beneficial to forming magnetic cores used in thermally hostile environments. Even at elevated temperatures as high as about 510° C., the preferred polybenzimidazole coating material imbues mechanical properties to the magnetic cores which include mechanical strength and high density as a result of strongly adhering the metal particles together.

Furthermore, the resistance of the preferred coating materials to high temperatures includes the ability to electrically insulate the metal particles from each other, so as to result in acceptable core losses for many applications, a critical magnetic characteristic for AC applications. The preferred coating materials are also highly resistant to a wide variety of chemicals, making their magnetic cores suitable for use in chemically hostile environments, such as the engine compartment of an automobile.

The coating materials are sufficiently lubricous so as to enable high densities at typical molding temperatures, such as up to about 7.4 grams per cubic centimeter, particularly when using the preferred polyimide (PI) and polybenzimidazole (PBI) coating materials. In addition, it is foreseeable that the preferred coating materials could be used for sintering applications, such as for forming a magnet body for DC applications.

In addition, it has been determined that the preferred polyimide, Imitech 201A, possesses a sufficiently high dielectric constant, approximately 8 kiloVolts/millimeter, so as to permit the use of relatively lower amounts of this preferred polyimide while obtaining comparable or even improved magnetic properties. In particular, compaction molded ferromagnetic bodies consisting of preferably 0.3 to about 0.5 weight percent, or specifically approximately 0.375 weight percent, of the preferred Imitech 201A polyimide, exhibited comparable magnetic core losses, yet significantly higher magnetic permeabilities, for example approximately 30 to 50 percent higher magnetic permeabilities, as compared to the compaction molded bodies containing twice that amount of the polyimide. It is believed that the increase in magnetic permeability is due to the relatively high dielectric constant of this polyimide. Therefore, the use of this preferred polyimide permits higher permeabilities without detrimentally affecting the magnetic core losses of the body. Even with a reduced amount, i.e., about 0.375 weight percent, of the preferred polyimide, the compaction molded bodies retained sufficient flowability and moldability during processing, as well as sufficient strength, without any loss in high temperature capabilities.

Accordingly, the amount of the preferred polyimide, Imitech 201A, used may vary greatly up to about one weight percent. Relatively large amounts of the preferred polyimide, i.e., on the order of about one weight percent will provide enhanced strength, particularly if the compaction molded articles is postbaked at an appropriate temperature to enhance the strength, yet relatively small amounts of the preferred polyimide, may be employed while obtaining improved magnetic permeabilities without detrimentally affecting the core losses of the molded article.

While our invention has been described in terms of a preferred embodiment, it is apparent that other forms could be adopted by one skilled in the art; for example, by substituting other suitable thermoplastic polymers having a heat deflection temperature of at least about 270° C., or by modifying the processing parameters such as the temperatures or pressures employed, or by substituting other polymers such as other aromatic polyamides, other polyimides, or other appropriate powdered materials such as other magnetic or magnetizable materials, or by utilizing the particular materials and methods for use in alternative applications. Accordingly, the scope of our invention is to be limited only by the following claims.

The embodiments of the invention in which an exclusive property or privilege is claimed are defined as follows:

1. A magnetic article comprising a plurality of ferromagnetic particles ranging in size from about 5 to about 400 microns wherein said plurality of ferromagnetic particles are each substantially uniformly encapsulated with a layer of a polymeric coating material, wherein said polymeric coating material is a thermoplastic having a heat deflection temperature of at least about 270 ° C., such that said polymeric coating material is about 0.1 to about one weight percent as compared to the total mass of said plurality of ferromagnetic particles;

the magnetic article withstanding exposure to elevated temperatures of at least about 400° C. without incurring a loss in the mechanical properties or magnetic characteristics of the magnetic article.

2. A magnetic article as recited in claim 1 wherein said polymeric coating material is polybenzimidazole.

3. A magnetic article as recited in claim 1 wherein said polymeric coating material is an aromatic polyamide.

4. A magnetic article as recited in claim 1 wherein said polymeric coating material is a polyimide chosen from the group consisting of a polyimide amine, or a polyimide derived from 3-4'oxydianiline and 4,4'oxydiphthalic anhydride, or a polyimide derived from 3-4'oxydianiline and polymethylene dianiline.

5. A magnetic article as recited in claim 1 wherein said polymeric coating material comprises about 0.4 to about 0.75 weight percent as compared to the total mass of said plurality of ferromagnetic particles.

6. A magnetic article as recited in claim 1 wherein said polymeric coating material is a polyimide derived from 3-4'oxydianiline and 4,4'oxydiphthalic anhydride, and comprises about 0.3 to about 0.5 weight percent as compared to the total mass of said plurality of ferromagnetic particles.

7. A magnetic article as recited in claim 3 wherein said aromatic polyamide is polyphthalamide.

* * * * *